Fig. 3.

Mar. 27, 1923.

A. H. SEGLER.
ROUTING MACHINE.
FILED APR. 3, 1919.

1,449,450.

12 SHEETS—SHEET 6.

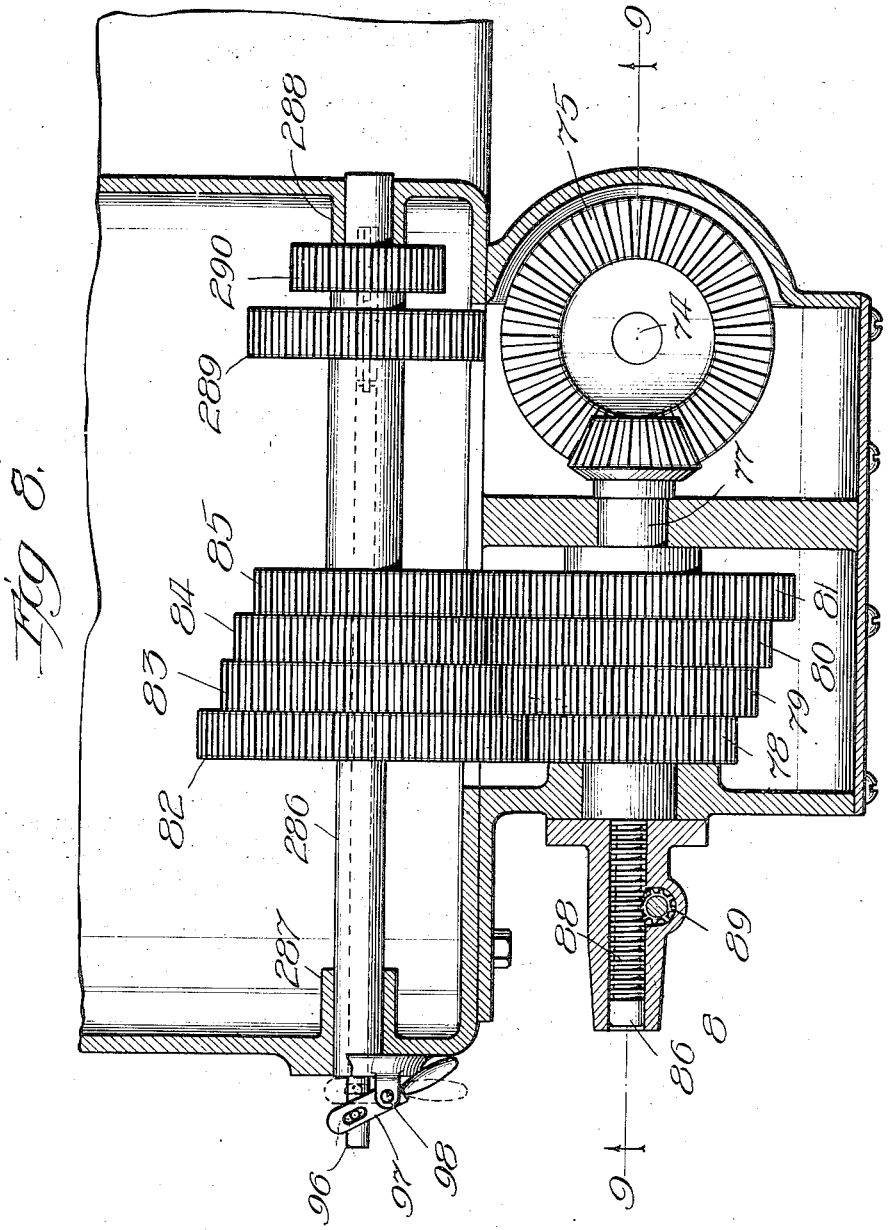

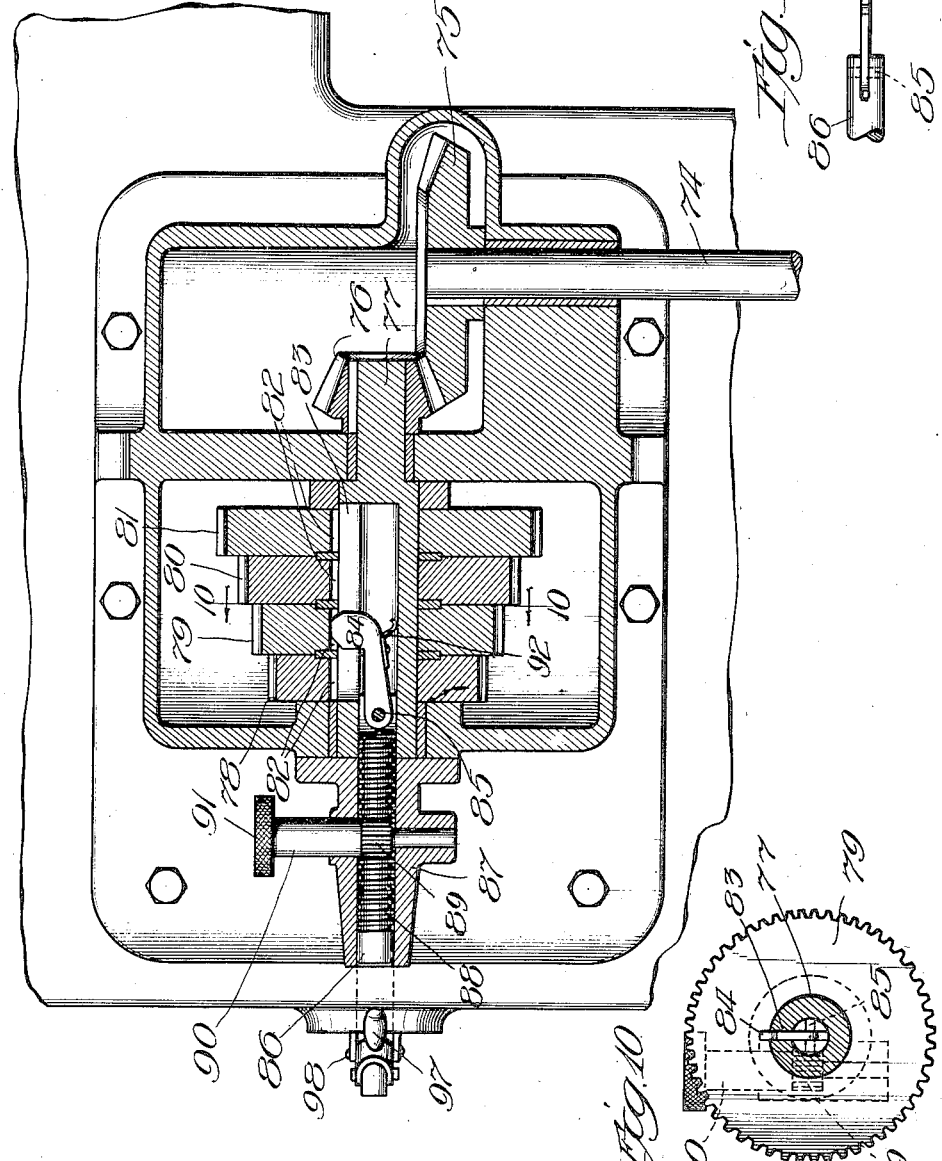

Mar. 27, 1923.
A. H. SEGLER.
ROUTING MACHINE.
FILED APR. 3, 1919.
1,449,450.
12 SHEETS—SHEET 9.
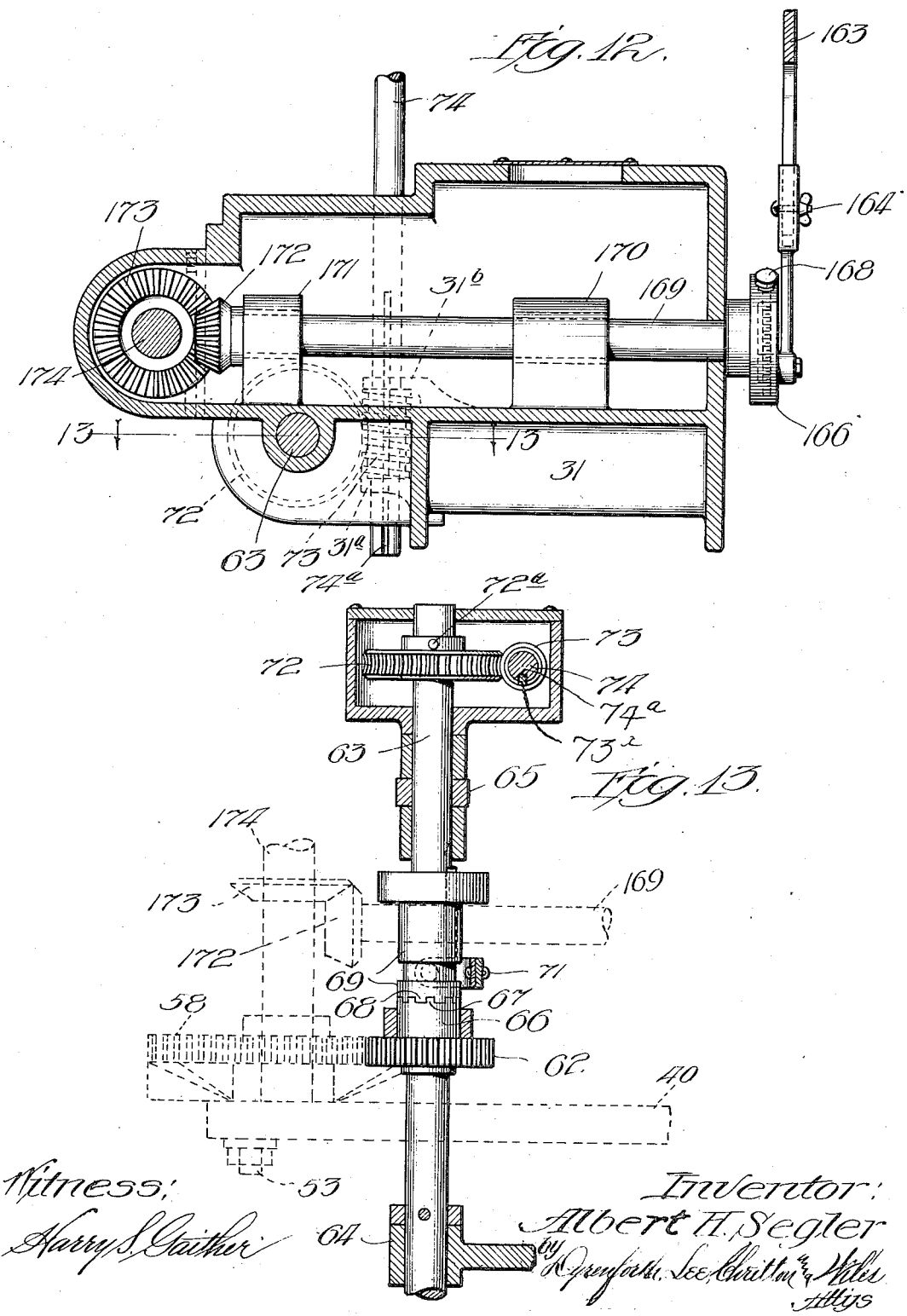

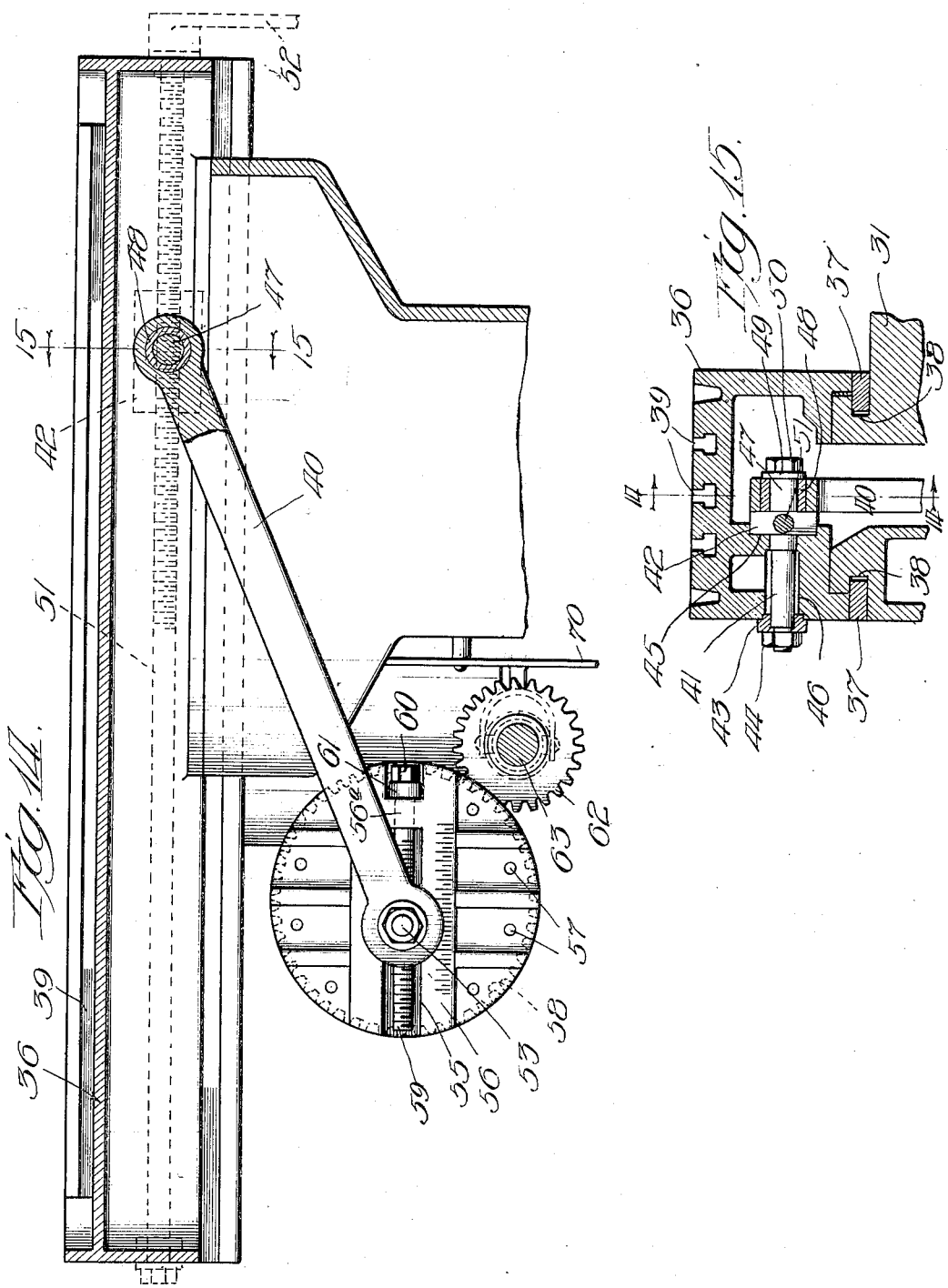

Mar. 27, 1923.

A. H. SEGLER.
ROUTING MACHINE.
FILED APR. 3, 1919.

1,449,450.

12 SHEETS—SHEET 12.

Witness:
Harry S. Gaither

Inventor:
Albert H. Segler
by Dyrenforth, Lee, Chritton & Wiles
Attys

Patented Mar. 27, 1923.

1,449,450

UNITED STATES PATENT OFFICE.

ALBERT H. SEGLER, OF CHICAGO, ILLINOIS, ASSIGNOR TO GOODMAN MANUFACTURING COMPANY, OF CHICAGO, ILLINOIS, A CORPORATION OF ILLINOIS.

ROUTING MACHINE.

Application filed April 3, 1919. Serial No. 287,165.

*To all whom it may concern:*

Be it known that I, ALBERT H. SEGLER, a citizen of the United States, residing at Chicago, in the county of Cook and State of Illinois, have invented a new and useful Improvement in Routing Machines, of which the following is a specification.

My invention relates more particularly to machines for cutting grooves in metal objects as, for example, shafts, to extend partway, or entirely, through the article, as, for example, in the former instance to produce a key-seat, though the machine may perform milling operations as, for example, to shape the ends of bars or other objects.

My primary objects, generally stated, are to provide improvements in machines of the character above referred to, to the end that the machine shall operate automatically, when set, to cut the grooves of any desired predetermined width, length and depth, within relatively wide ranges; that damage to the cutting tools and to the work, shall be reduced to the minimum, and generally provide for the rapid cutting of the work and the accurate duplication of the cutting of the grooves.

Figure 1:
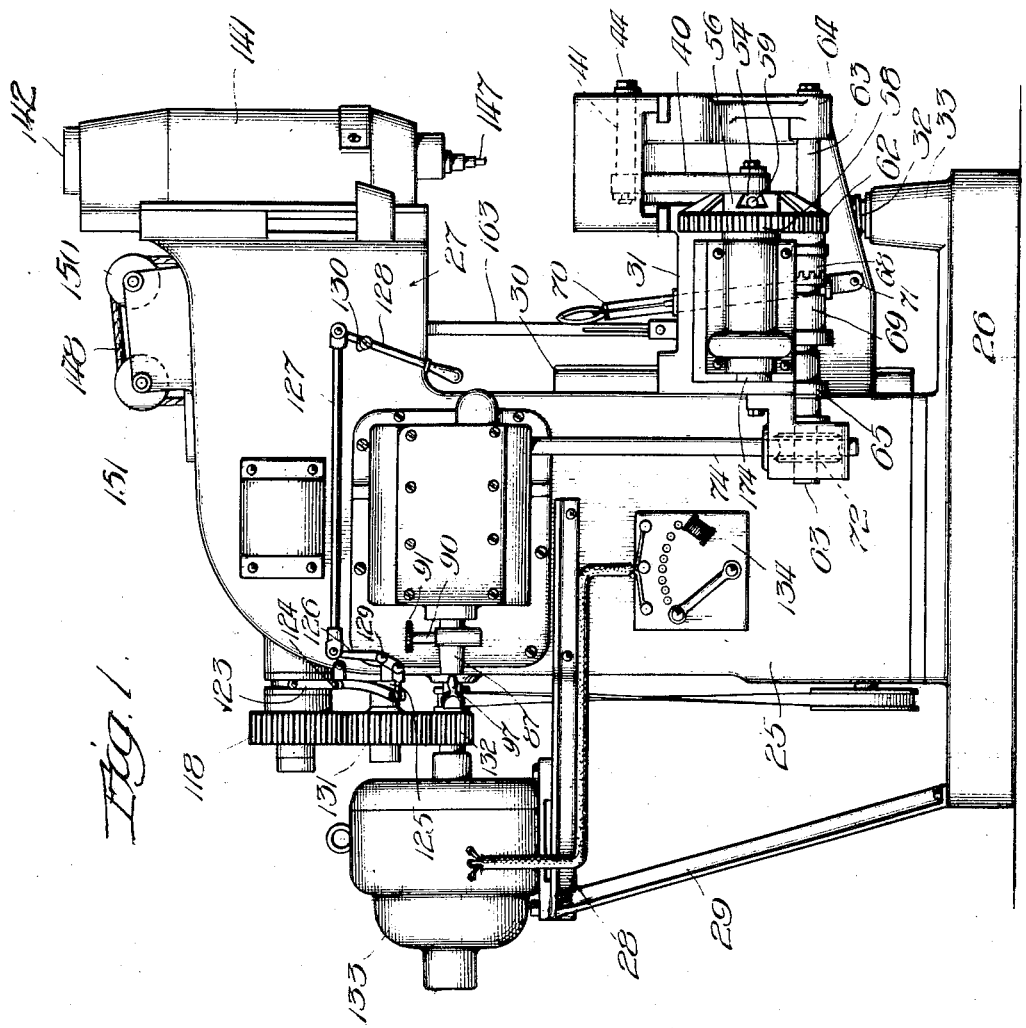
Figure 2:
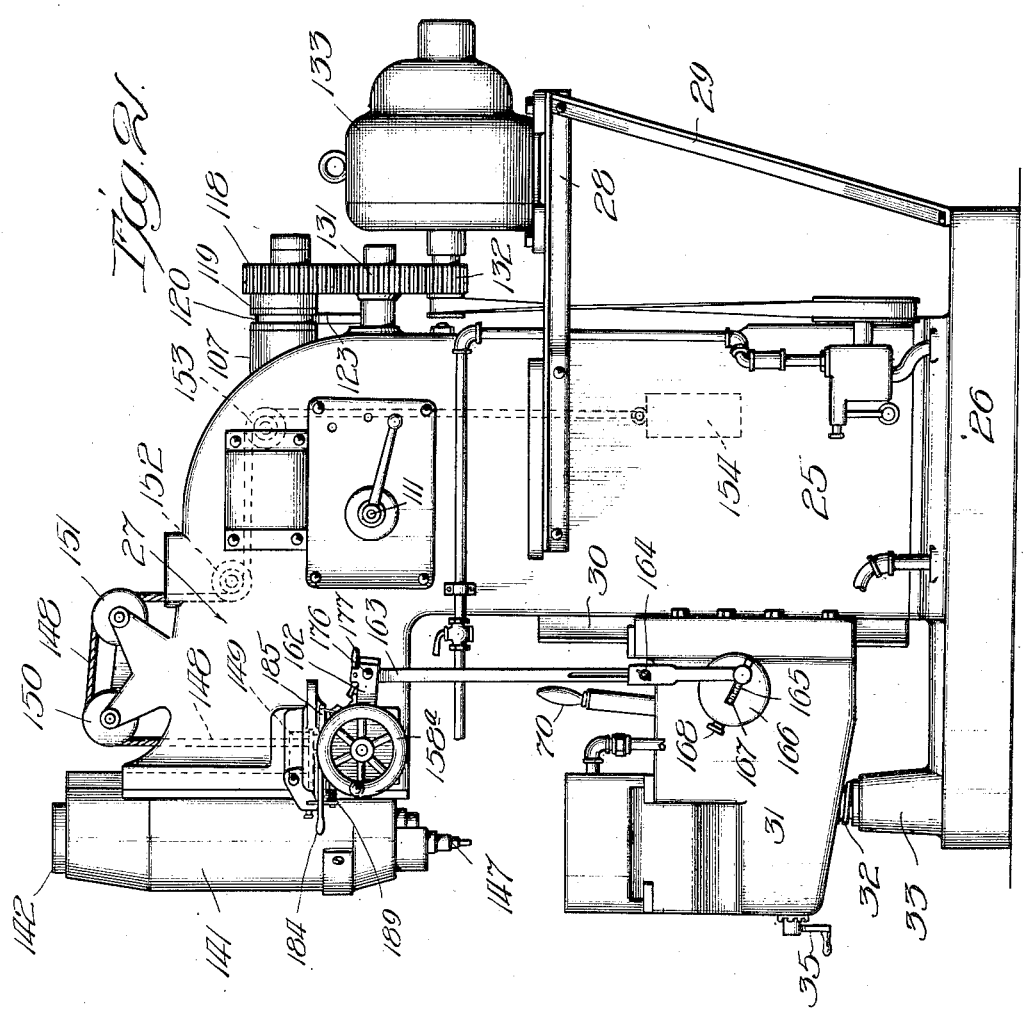
Figure 4:
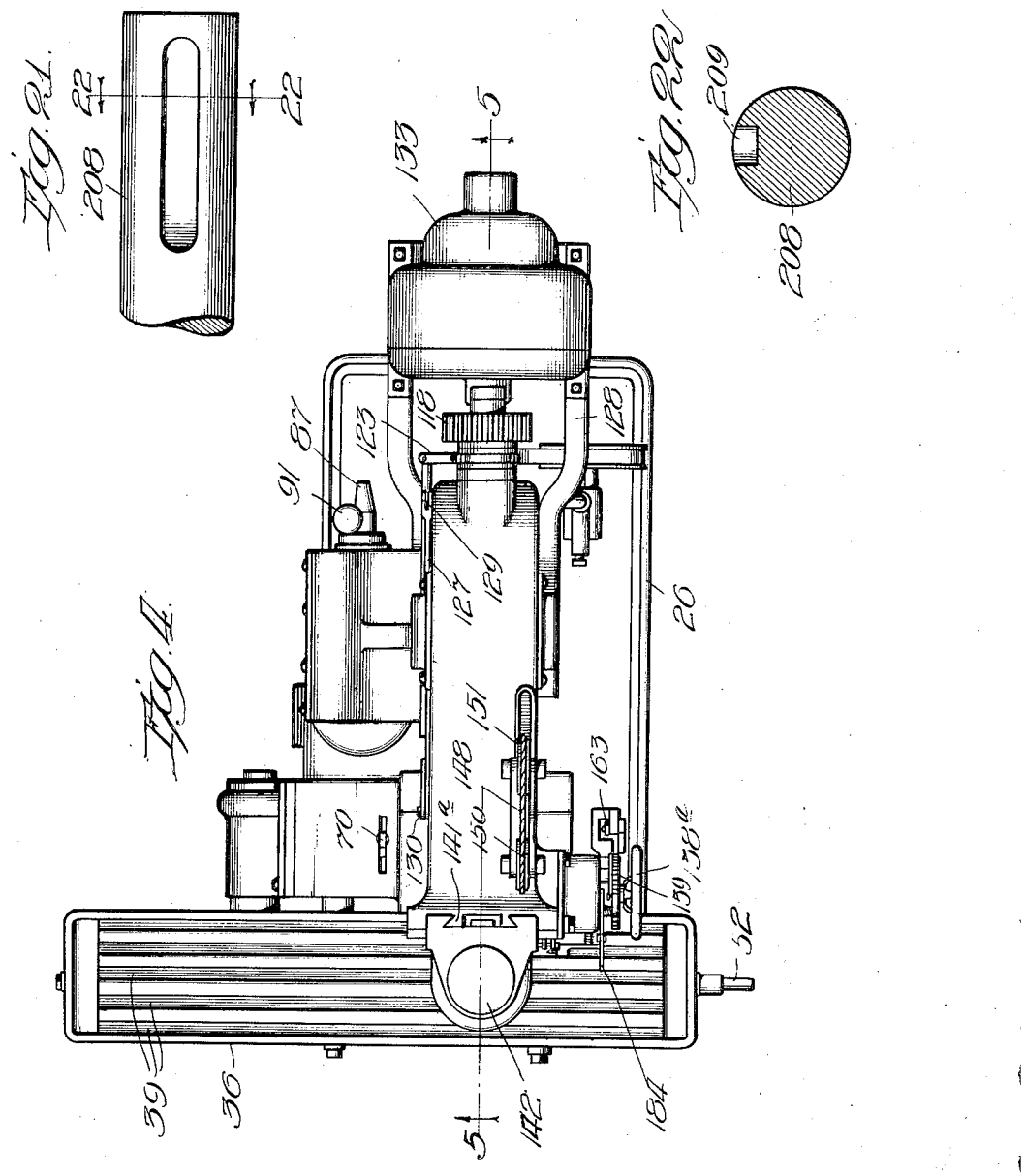
Figure 5:
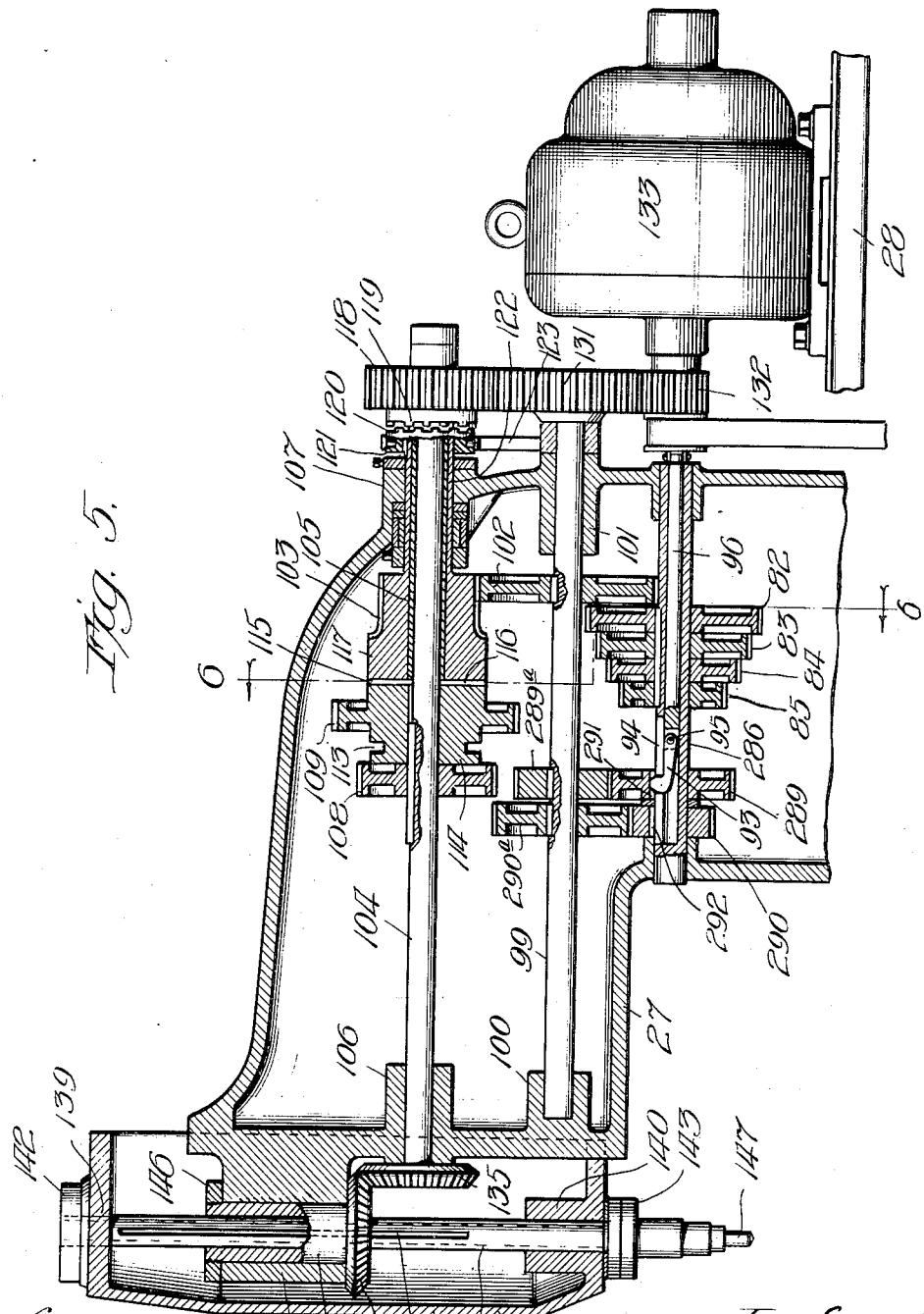
Figure 6:
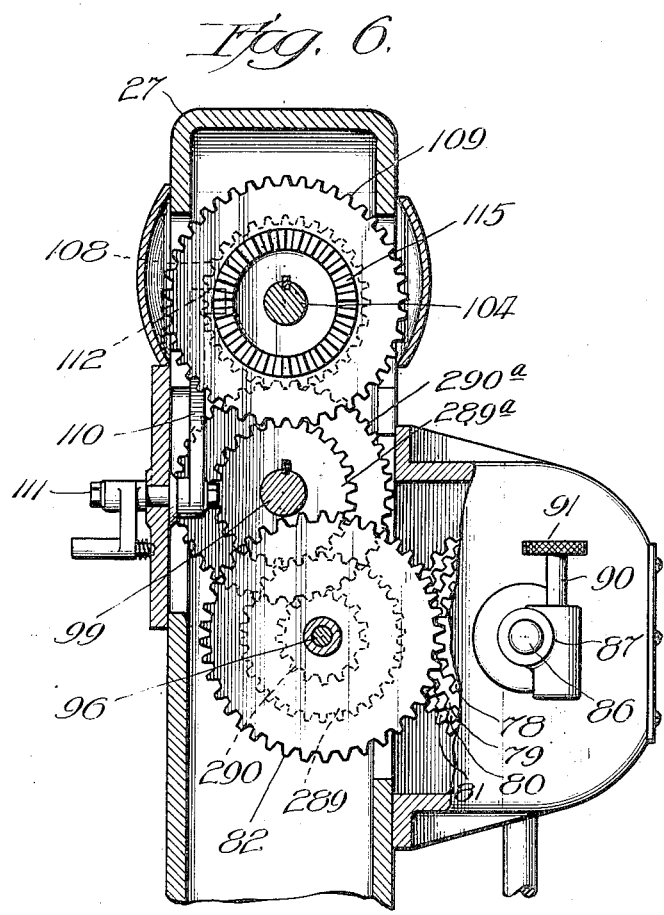
Figure 7:
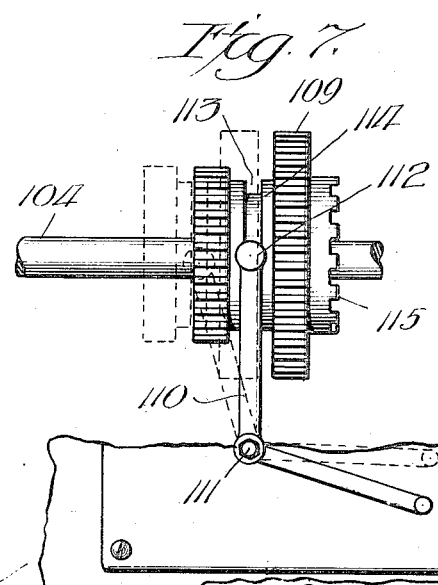
Figure 16:
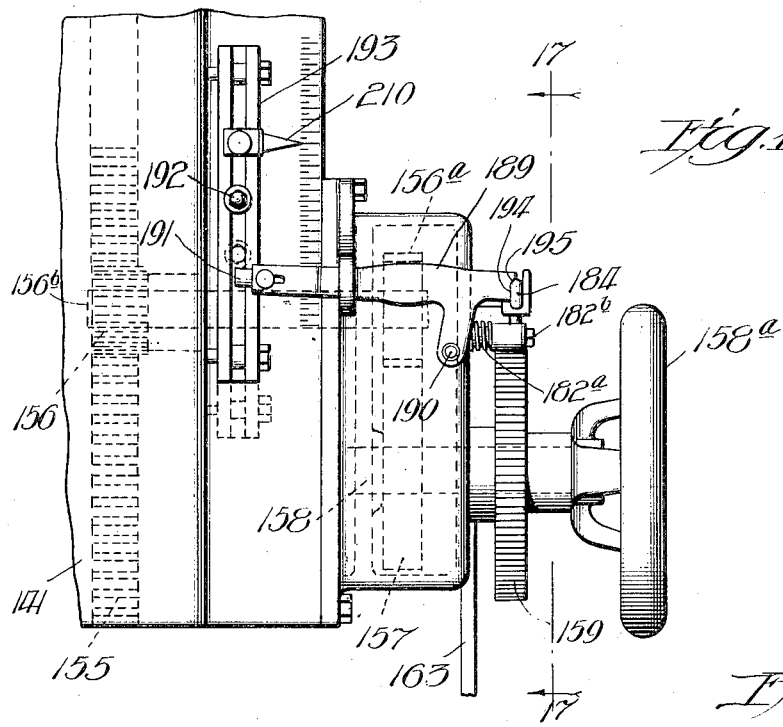
Figure 17:
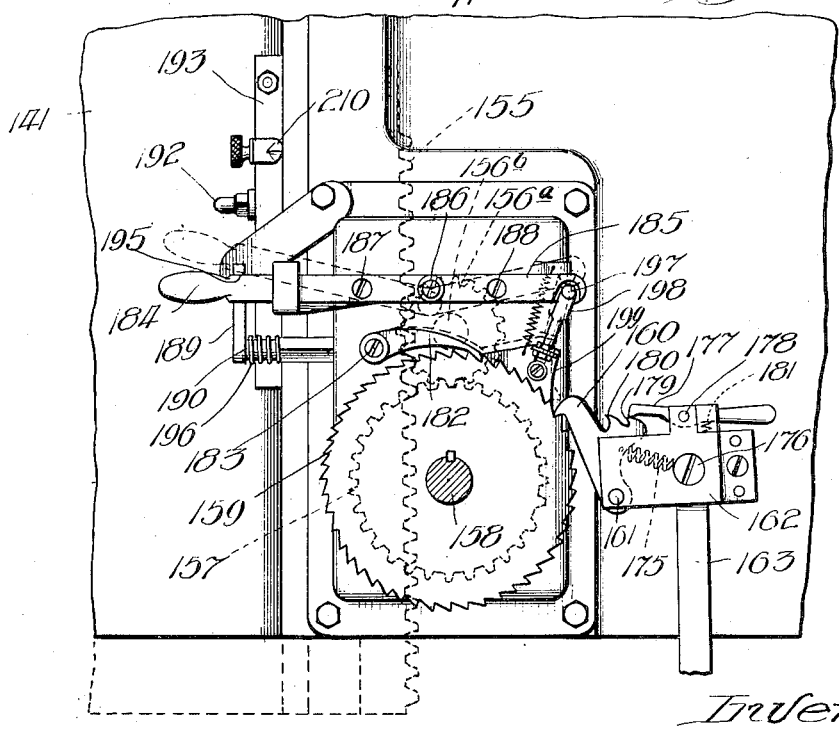
Figure 18:
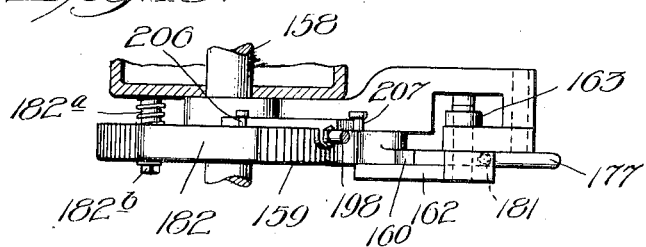
Figure 19:
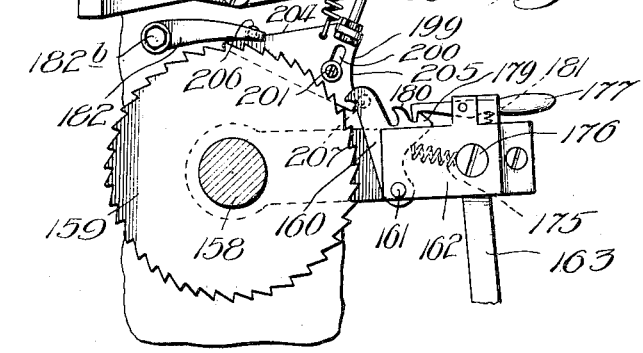
Figure 20:
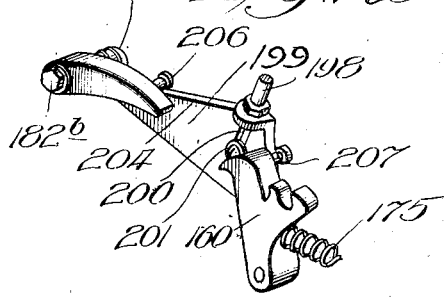

Referring to the accompanying drawings, Fig. 1 is a view in side elevation of a machine constructed in accordance with my invention. Fig. 2 is a view of the machine in side elevation, this view being taken from the opposite side of the machine. Fig. 3 is a view in front elevation of the machine. Fig. 4 is a plan view of the machine. Fig. 5 is an enlarged sectional view taken at the line 5—5, on Fig. 4, and viewed in the direction of the arrows. Fig. 6 is a section taken at the irregular line 6—6, on Fig. 5 and viewed in the direction of the arrows. Fig. 7 is a broken view in elevation of a clutch-equipped portion of the transmission between the power device and certain of the operative parts of the structure. Fig. 8 is a plan sectional view through a portion of the gear transmission. Fig. 9 is a section taken at the line 9—9, on Fig. 8, and viewed in the direction of the arrows. Fig. 10 is a section taken at the line 10—10, on Fig. 9, and viewed in the direction of the arrows. Fig. 11 is a broken plan view of a portion of the mechanism co-operating with the gears of the transmission mechanism for varying the speed of rotation of certain of the parts. Fig. 12 is a view in elevation, partly sectional, of a portion of the mechanism through the medium of which the tool is fed downwardly to the work. Fig. 13 is a plan sectional view taken at the line 13—13 on Fig. 12 and viewed in the direction of the arrows. Fig. 14 is a broken sectional view taken at the line 14—14 on Fig. 15, and viewed in the direction of the arrows. Fig. 15 is a section taken at the line 15—15 on Fig. 14 and viewed in the direction of the arrows. Fig. 16 is an enlarged face view, viewed from the front of the machine, of the tool carrier and the means for operating the carrier. Fig. 17 is a section taken at the line 17—17 on Fig. 16 and viewed in the direction of the arrows. Fig. 18 is a broken plan view of a portion of the mechanism shown in Fig. 16; Fig. 19 is a view in side elevation of a portion of the mechanism shown in Fig. 17, illustrating the feed mechanism after it has been moved to inoperative position; Fig. 20 is a perspective view of a portion of the feed mechanism of Fig. 19; Fig. 21 is a broken view of a shaft having a key-way cut therein by the machine of the preceding figures; and Fig. 22, a section taken at the line 22—22 on Fig. 21 and viewed in the direction of the arrows.

The frame or body of the machine comprises a casing 25 mounted upon a base 26 and provided with a forwardly projecting hollow extension 27 at its upper end, and a rearwardly extending frame 28 secured to the body 25 and braced as through the medium of the angle bars 29. The front side of the body 25 is provided with vertical guides 30 with which co-operates, a forwardly extending hollow section 31 which carries the work-holder hereinafter described and is bodily movable in a vertical plane as through the medium of a screw 32 having threaded connection with a hollow internally threaded boss 33 on the base 26 and journaled in the section 31, this shaft being connected with any suitable mechanism for rotating it to raise and lower the section 31 on the base 26. By way of example such mechanism may comprise the shaft 34 journaled in the section 31 and having any suitable connection with the threaded shaft 32 in a manner not shown, but which will be readily understood, by which the screw 32 may be rotated from the shaft 34, the outer end of the shaft 34 being equipped with a crank 35 for rotating it.

The upper surface of the section 31 is surmounted by a longitudinally movable work-support 36 guidingly confined on the section 31 by means of the sections 37 which extend into undercut grooves 38 in section 31, the upper surface of the work-support 36 being preferably grooved, as indicated at 39, for receiving work-clamping devices as is common in the work-supports of milling machines. The work-support 36 is equipped with a connection for a pitman represented at 40, this connection comprising a spindle 41 secured in place by means of a head 42 thereon and a gland 43 held in place by a nut 44. The head 42 is of rectangular shape as represented and opposes at its upper and lower surfaces, the upper and lower walls of a channel 45, provided in the interior of the support 36, the spindle 41 being located in an elongated slot 46 extending lengthwise of the support 36 for a purpose hereinafter described. The inner end of the spindle 41 is provided with a stud-portion 47 on which the upper end of the pitman 40 is journaled, a bushing 48 lining this journal connection and the pitman being held against displacement by a washer and nut 49 and 50 on the stud 47. A threaded shaft 51 extending through the work-support 36 and arranged longitudinally thereof and journaled at its ends in the work-support, extends through the head 42 with which it has threaded engagement, whereby upon rotating the shaft 51, as through the medium of a handle 52 connected with one end of this shaft, the support 36 may be adjusted lengthwise in either direction in Fig. 14 relative to the head 42 and the connection of the pitman 40 with its driving mechanism hereinafter described. The opposite end of the pitman 40 is journaled on a pin 53 carried by a block 54 mounted in guides 55 provided on the face of a disk 56 secured, as through the medium of bolts 57, to the face of a gear 58, the disk 56 having journaled thereon in a web 56ª, a threaded shaft 59 having threaded engagement with the block 54 and provided with a head 60 bearing against a washer 61, confined between the head 60 and web 56ª, through the medium of which shaft the block 54, upon rotating the shaft 59, may be adjusted toward and away from the center of the gear 58, to vary the throw of the pitman 40 which is thus connected with this gear by an adjustable crank connection, whereby upon rotating the gear 58 the work-support 36 is reciprocated on the bed of the machine. The gear 58 meshes with a pinion 62 journaled on a shaft 63 mounted in stationary bearings 64 and 65 provided on the machine, the gear 62 being provided with a hub 66 having clutch teeth 67 at one end adapted to co-operate with clutch-teeth 68 on a clutch-sleeve 69 splined to, and longitudinally movable on, the shaft 63, the sleeve 69 being movable into and out of clutching position through the medium of a hand-lever 70 pivoted on a stationary part of the machine as indicated at 71. The shaft 63 is driven through the medium of a worm-wheel 72 pinned thereon as indicated at 72ª to rigidly secure this wheel 72 to the shaft, this wheel meshing with a worm 73 on a vertically-disposed shaft 74. The worm 73 carries a spline 73ª which extends into a longitudinally-extending slot 74ª in the shaft 74, whereby the worm may shift vertically on this shaft without disturbing its driving connection therewith, the member 31 being provided with apertured extensions 31ª and 31ᵇ through which the shaft 74 extends, these extensions being arranged at opposite ends of the worm 73 and in journal contact therewith. The shaft 74 at its upper end carries a bevel gear 75 (Figs. 8 and 9), meshing with a bevel pinion 76 rigid on a shaft 77 journaled on the machine-casing and carrying a plurality of gears 78, 79, 80 and 81 of different diameters, journaled thereon and containing longitudinally extending grooves 82 in the central openings therethrough at which these gears surround the shaft 77. The shaft 77 is longitudinally grooved as indicated at 83 and slidable in this groove is a key 84 pivotally connected, as indicated at 85, with a longitudinally movable bar 86 slidable in a stationary boss 87 on the frame of the machine, the bar 86 having a rack-section 88 which meshes with a pinion 89 secured to a shaft 90 arranged at right-angles to the bar 86 and journaled in the boss 87, the upper end of the shaft 90 being knurled, as indicated at 91, to facilitate the turning of the same by hand to move the key 84 into the groove 82 of any one of the gears 78, 79, 80, or 81, this key carrying a spring 92 tending to project the key into the groove 82 of the one of the gears it opposes in its different positions of adjustment. Meshing with the gears 78, 79, 80 and 81 are gears 82, 83, 84, and 85, respectively, rigidly secured to a hollow shaft 286 journaled in bearings 287 and 288 on a stationary part of the machine, this shaft being equipped with gears 289 and 290 rotatable thereon and containing key-ways 291 and 292 with which co-operates a key 93 working through a slot 94 in the shaft 286 and pivotally supported, as indicated at 95, on the end of a rod 96 located within the shaft 286 and longitudinally movable therein, as through the medium of a lever 97 pivoted at 98 on a stationary part of the machine, to shift the key 93 into either of the key-ways 291 or 292 to connect the gears 289 and 290, respectively, with the shaft 286, or to shift it to a position in which neither of these gears are connected with the shaft 286, as desired. Meshing with the gears 289 and 290 are gears 289ª and 290ª, respectively, rigidly connected with a shaft 99 journaled in bearings 100 and 101 in the frame of the machine, this shaft also carrying a gear 102 rigid therewith which meshes with a gear 103 rotatably mounted on a shaft 104, with a lining sleeve 105 interposed between these parts. The shaft 104 is journaled in bearings 106 and 107 on the frame of the machine and has splined thereon the gears 108 and 109 adapted to be moved along this shaft into intermeshing engagement with the gears 289ª and 290ª, respectively, through the medium of a bell-crank lever 110 fulcrumed at 111 to the frame of the machine and extending at a pin 112 thereon into an annular groove 113 in the hub portion 114 of the gear 109, the gears 108 and 109 being connected together to shift as one, and so arranged that when either one of these gears is in mesh with its co-operating gear 289ª or 290ª as the case may be, the other of these gears will be out of mesh with its co-operating gear. The hub 114 on the face thereof adjacent the gear 103 is provided with clutch-teeth 115 which intermesh with clutch-teeth 116 on the hub 117 of the gear 103 when the parts are in the position shown in Fig. 5. Journaled on the outer end of the shaft 104 is a gear 118 provided on a face thereof with clutch-teeth 119 adapted to intermesh with clutch-teeth 120 on a sliding-sleeve 121 splined on a sleeve-extension 122 of the gear 103, this clutch being movable into and out of engagement with the clutch teeth on the gear 118 through the medium of a clutch-operating lever 123 pivotally connected at 124 with the frame of the machine and at its lower end with a link 125 connected with the lever mechanism composed of the bell-crank 126, rod 127 and hand-operated lever 128, the bell-crank 126 and lever 128 being pivotally connected intermediate their ends with the frame of the machine as indicated at 129 and 130, respectively. The clutch for the gear 118 is shown out of operating position and is moved into operating position by swinging the lower end of the lever 128 to the right in Fig. 1. The gear 118 meshes with a gear 131 rotatably mounted on the shaft 99, this gear in turn meshing with a gear 132 rigidly secured to a driven-shaft which may be driven in any suitable way and which may be the operating shaft of a power device, such as the electric motor illustrated at 133 and supported on the frame 28 of the machine, the current to the motor being controlled through the medium of the switch mechanism represented at 134.

The shaft 104 is equipped at its forward end with a bevel-gear 135 rigid thereon which meshes with a bevel-gear 136 provided with a sleeve-extension 145 journaled in a lug 144 on the machine frame, the gear 136 being splined, as indicated at 137, on a vertically-disposed rotary shaft 138 journaled at its ends, as indicated at 139 and 140 in a vertically movable frame 141, this shaft being equipped at its upper and lower ends with the collars 142 and 143, respectively fixed thereon. The sleeve 145 is provided at its upper end with a collar 146 surrounding the shaft 138 and bearing against the top of the lug 144 to take the weight of the gear 136 and sleeve 145 from the gear 135. The lower end of the shaft 138 is constructed in any suitable way to hold a routing tool, as, for example, as indicated at 147, and in the operation of the machine, as is hereinafter more fully set forth, the member 141 which has tongue and groove connection with the stationary extension 27 of the frame as indicated at 141ª, to guidingly confine it, is movable up and down relative to the work-support 36 for the purpose of feeding the tool to the work and withdrawing it therefrom after the cutting has been completed, the vertically movable member 141 and the parts movable therewith as stated, being counterbalanced as through the medium of a cable 148 connected at one end with a bracket 149 extending rearwardly from the member 141, thence passing over pulleys 150 and 151 at the upper end of the frame of the machine, thence under a pulley 152 and over a pulley 153 on the frame of the machine and connecting at its lower end with a counterbalancing weight 154 located inside of the frame of the machine.

It will be understood from the foregoing that the power delivered by the motor 133 is transmitted through the gears 132, 131, 118, thence through the clutch 119 and 120 if this clutch is in, to the sleeve 122 and gear 103 to gear 102, shaft 99, gear 289ª or 290ª to gears 289 or 290 as the case may be, depending upon the key 93 being engaged with the gear 289 or 290, respectively, thence to shaft 286, gears 82, 83, 84, and 85 and to the one of the gears 78, 79, 80, or 81 that the key 84 is in engagement therewith (in the drawings this being the gear 79, Fig. 9), thence through the shaft 77 to bevel 76, bevel-gear 75, shaft 74, worm 73, worm-wheel 72, shaft 63, gear 62, if the clutch 67 and 68 is in, gear 58 and through the pitman 40 to the reciprocating bed 36. The provision of the gear connection between the shaft 286 and 99 as described, provides for the driving of the shaft 286 at either of two speeds and the selective stepped gear arrangement between the shafts 286 and 77, provides for four different speeds, thus making possible the driving of the shaft 77 and consequently the reciprocating of the bed 36 at anyone of eight different speeds relative to the shaft which delivers the power to the machine so far as the parts just referred to, is concerned. In this connection it may be stated that further speed variation between the shaft which furnishes power to the machine and the mechanism which reciprocates the work-holder 36, may be provided for by reason of the connections shown and described between the worm-wheel 72 and its supporting shaft 63 and the worm 73 and its shaft 74, which permits the worm-wheel and worm to be replaced by others producing a different speed ratio.

The provision of the gear connections between the shafts 99 and 104 as stated, permits the tool-driving shaft 138 to be driven at any one of three speeds relative to the shaft which delivers power to the machine. When the gear 109 is clutched to the gear 103 at the teeth 115 and 116 and the clutch 119 and 120 is in, the shaft 104 will be driven directly from the gear 118 or, in other words, at the same speed as the gear 118, but upon disconnecting the clutch at 115—116 by sliding the clutch to the left in Fig. 5 and moving the gear 108 into mesh with the gear 290ª, or the gear 109 into mesh with the gear 289ª, the shaft 104 will be driven at a slower speed than when directly driven, the drive being through the gear 103, gear 102, shaft 99, gear 290ª or 289ª as the case may be, through the companion gear 108 or 109 depending upon which of these gears mesh with the companion gear, and the shaft 99 and thence through the shaft 104 to the gears 135 and 136 and to shaft 138.

It may be here stated that in the operation of the machine the work-support 36 is reciprocated back and forth a distance equal to the length of the cut to be made and the tool 147 fed downwardly toward the work by an intermittent operation, the following being a description of the mechanism provided for this purpose in accordance with the illustrated embodiment of my invention.

The vertically movable member 141 is provided with a rearwardly projecting rack 155 which meshes with a gear 156 on a shaft 156ᵇ journaled on a stationary part of the machine and carrying a pinion 156ª which meshes with a gear 157 connected with a shaft 158 likewise journaled in a stationary part of the machine and having rigidly secured thereto a ratchet 159, this shaft also carrying a hand-wheel 158ª. Co-operating with the ratchet 159, the teeth of which are disposed as shown in Fig. 17, is a pawl 160 pivotally connected, as indicated at 161, with a head 162 rigidly secured to the upper end of link 163 preferably formed in sections adjustable lengthwise of each other and held together by a set-screw 164, the lower end of this link having journal connection with a block not shown, located in a guide-slot 165 in a disk 166 and connected with an adjusting-screw 167 having a finger piece 168 for rotating this screw, this construction being of the same character as the connection of the pitman 40 with the disk 56, it being understood that the described journal connection between the link 163 and the disk 166 may be adjusted to and from the center of this disk to vary the length of the stroke of the link 163. The disk 166 is mounted on the outer end of a shaft 169 journaled in bearings 170 and 171 on a stationary part of the frame, the opposite end of this shaft carrying a bevel-gear 172 which meshes with a bevel-gear 173 having double the number of teeth and rigid on a shaft 174 journaled in the frame of the machine and to which the gear 58 is rigidly secured, it being understood from the foregoing that the disk 166 will be rotated at twice the speed of the gear 58, whereby the link 163 will be given two complete reciprocations while the work-support 36 is making one complete reciprocation. The pawl 160 is held at all times in the normal position of the machine, in engagement with the toothed periphery of the ratchet 159 by means of a coiled spring 175 confined, under compression, between the pawl 160 and a pin 176 on the head 162, this pawl engaging the teeth of the ratchet 159 to rotate the latter in clockwise direction in Fig. 17, upon the downward movement of the link 163 and moving idly over the teeth of the ratchet on the upward movement of this link. The head 162 is also equipped with a latch 177 pivotally connected at a pin 178 with the head 162 and adapted to hook over one or the other of the projections 179 and 180 on the pawl 160, for a purpose hereinafter described, a spring 181 located between the head 162 and the other end of this latch tending to yieldingly force this latch into interlocking engagement with the pawl 160 as stated. In order that the ratchet 159 will not be displaced in the upward movement of the pawl 163, a second pawl 182 is provided, this pawl being pivotally supported, as indicated at 183, on the frame of the machine and normally bearing against the toothed periphery of the ratchet 159, under the action of a coiled spring 182ª surrounding a pin 182ᵇ pivotally supporting this pawl, this pawl idling in the rotation of the ratchet in clockwise direction in Fig. 17.

Co-operating with the feeding mechanism described, are means for automatically discontinuing the actuation of the feeding means and therefore the feeding of the tool 147 toward the work, these means comprising a toggle formed of the levers 184 and 185 pivotally connected together at 186, the toggles 184 and 185 being pivotally connected as indicated at 187 and 188, respectively, with the frame of the machine. The forward end of the lever 184 co-operates with one end of a lever 189 pivotally supported on the frame of the machine by a pin 190 and extending at its opposite end, indicated at 191, into the path of downward movement of a tappet 192 carried by the vertically movable member 141, the tappet 192 being adjustable vertically in a vertically slotted guide-member 193 carried by the member 141. The end of the lever 189 at which it engages the lever 184 is recessed, as indicated at 194, to provide a shoulder 195 beneath which the forward end of the lever 184 extends in the normal position of the machine, a coiled spring 196, surrounding the pin 190 and connected at one end with the latter and at its opposite end with the lever 189 operating to yieldingly rotate this lever in clockwise direction in Fig. 16 with the result of holding the toggle levers 184 and 185 in the full-line position represented at Fig. 17, against the action of spring-means hereinafter described, until released by the actuation of the lever 189 by the engagement therewith of the block 192 in its downward movement, to withdraw the shoulder 195 from engagement with the lever 184. The rear end of the lever 185 is pivotally connected, as indicated at 197, to the upper end of a link 198 rigidly connected with the upper end of a plate 199 containing a guide slot 200 in which a headed pin 201, carried by the frame of the machine, extends. This plate is connected with the lower end of a coiled spring 202 connected at its upper end, as indicated at 203, with the frame of the machine, and so tensioned that it normally tends to raise the plate 199 and swing the toggle to the dotted position represented in Fig. 17 and the position shown in Fig. 19, this plate presenting wedge-surfaces 204 and 205 which oppose pins 206 and 207 carried by the pawls 182 and 160, respectively, the parts described being so arranged as shown, that when the toggle-lever is in the full-line position represented in Fig. 17, the surfaces 204 and 205 of the plate 199 will be out of engagement with the pins 206 and 207, but when the lever 189 is disengaged from the lever 184, and the toggle formed of this lever and lever 185 shifts, under the action of the spring 202 to the position shown in Fig. 19, the surfaces 204 and 205 will have engaged with the pins 206 and 207 lifting both of the pawls 182 and 160 out of engagement with the ratchet 159, in which position the latch 177 becomes locked with one or the other of the shoulders 179 and 180 which locks the pawl 160 in a position in which it cannot engage with the teeth of the ratchet 159 in the downward movement of the link 163.

In the use of the machine the piece of work to be slotted as, for example, the shaft represented at 208, is rigidly secured, by any suitable means (not shown), but which, by way of example, may be the clamps used on the beds of milling machines, to extend lengthwise of the bed 36 and beneath the routing tool 147. The operator then releases the latch 177 from the pawl 160 and latches the lever 184 of the toggle (Figs. 16 to 19, inclusive), under the shoulder 195 as shown by the full-lines in Fig. 17, which permits the pawls 160 and 182 to engage the teeth of the ratchet 159, and shifts the clutch 120 to the right in Fig. 5 to connect the gear 118 with the gear 103, swings the lever 70 forwardly to clutch the gear 62 with the shaft 63, and starts the motor 133. The operator then rotates the hand-wheel on the shaft 158 in clockwise direction in Fig. 17, thereby causing the vertically movable tool-holding member 141 to lower and position the tool 147 against the upper side of the work. It will be understood from the foregoing that thus conditioning the machine causes the work-holder 36 to be reciprocated back and forth on the bed 31, by the crank connection between this holder and the gear 58 which is driven from the shaft 63, and that upon each downward stroke of the link 163 the pawl 160, by engaging with a tooth of the ratchet 159, rotates the latter in clockwise direction in Fig. 17 and thus automatically lowers the tool-holding member 141 a predetermined distance, depending upon the distance from the point of eccentric connection of the link 163 with the disk 166, to the center of rotation of this disk.

It will be noted from the foregoing that the tool 147 is fed downwardly twice during each complete reciprocation of the work-holder, and the parts of the machine are so constructed and arranged, substantially as shown, that the downward feed of the tool will occur while the work is moving, preferably during the beginning of the stroke of the work-holder. In other words, assuming the work-holder 36 to be moving to the right in Fig. 3, the parts are so arranged that the downward feed of the tool 147 begins the moment the work-holder comes to rest following its movement to the right in Fig. 3 and continues during a portion of the movement of the work-holder to the left in Fig. 3, and when the work-holder has reached the limit of its movement in this direction, the tool 147 is again automatically fed down into the work to cut it while the work-holder is moving to the right in Fig. 3, and so on throughout the series of cutting operations, or, in other words, until the block 192 strikes the lever 189, thereby permitting the pawls 160 and 182 to disengage from the ratchet 159 and discontinue the feeding of the tool, the work-holder continuing to reciprocate and by this action causing the bottom of the key-way to be cut to level condition, the key-way thus formed being as shown at 209 in Figs. 21 and 22.

The movable tool-holder 141 is preferably equipped with a pointer 210 adjustable up and down in the guide-way 193, this pointer co-operating with a scale 211. The pointer and scale are provided for use in connection with the adjusting of the block 192 to effect the desired depth of cut and, in practice, this block would be set above the lever 189 a distance which the operator knows to be less than the depth of cut desired and approximating the depth of cut, and by observing the movement of the pointer 210 along the scale 211 in the operation of the machine to the point at which the feed is arrested, can readily judge of the further necessary adjustment of the block 192 in an upward direction to effect the desired depth of cut, this arrangement being intended more particularly for setting the block 192 when it is intended to cut the same depth of key-way in many articles.

The work-holder 36 may be adjusted lengthwise relative to the tool 147 as desired by operating the screw 51 through the medium of the crank 52, and the length of stroke of the work-holder may be varied as desired within the limits of the machine, by adjusting the screw 59, these adjustments permitting a groove to be cut in the work at any desired point thereon and of any desired length within the range of the machine, the length of the groove produced depending upon the stroke of the work-holder. In this connection, attention may be directed to the explanation in the forepart of the specification relative to the speed-changing gearings whereby the speed of rotation of the tool 147 may be varied as desired and likewise the speed of rotation of the gear 58, the latter for controlling the speed of movement of the work-holder.

The machine is thus not only adapted to the cutting of a great variety of widths of grooves, in the form of key-ways or slots, and of a great variety of lengths and at any desired position on the work, but the timing of the feeding of the tool relative to the reciprocations of the work-holder as described, reduces to the minimum the stress exerted against the tool with the result that while an accurate groove is cut in the work, damage to the tool is reduced to the minimum. Furthermore, it is possible by my machine to accurately duplicate the grooves in different articles whereby all of the articles may have formed therein grooves of the same dimensions and at the same location on the articles.

Another feature of the machine is that at a predetermined time the feeding of the tool toward the work is stopped and permanently discontinued so that even if the machine continues to operate for a relatively great length of time, as by the neglect of the operator to stop the machine, no damage can be done to the work.

In the particular construction illustrated, the frame-extension 31 is mounted, as hereinbefore explained, on a threaded shaft 32. This is for the purpose of permitting this part of the machine, with the parts carried thereby, to be bodily adjusted in a vertical plane so that the plane in which the work-holder extends, may be changed, it being understood that in this movement of the member 31, the worm 73, while maintaining intermeshing engagement with the worm wheel 72, moves vertically with the wheel 72 and member 31.

It will be understood that one way in which the machine may be used for meeting ends of objects, as for example shafts, is that of supporting the shafts in end to end relation with the joint at which the shafts abut extending coincident with the tool when the work-holder is midway between the ends of its stroke, thus cutting away the upper surfaces at the abutting ends of the shafts, a uniform distance.

While I have illustrated and described a particular construction of machine embodying my invention, I do not wish to be understood as intending to limit it thereto as the same may be variously modified and altered without departing from the spirit of my invention.

What I claim as new and desire to secure by Letters Patent is:

1. In a machine of the character set forth, the combination of a reciprocable work-holder and means for reciprocating it, a tool-holder supported to be moved toward and away from said work-holder, and means operating automatically to cause said tool-holder to feed the tool therein against the work in said work-holder during the movement of said work-holder in both directions.

2. In a machine of the character set forth, the combination of a reciprocable work-holder and means for reciprocating it, a tool-holder supported to be moved toward and away from said work-holder, and means operating automatically to cause said tool-holder to feed the tool therein intermittently against the work in said work-holder during the movement of said work-holder in both directions.

3. In a machine of the character set forth, the combination of a reciprocable work-holder and means for reciprocating it, a tool-holder supported to be moved toward and away from said work-holder, and means operating automatically to cause said tool-holder to feed the tool therein against the work in said work-holder during the movement of said work-holder in both directions at the beginning of each stroke of the latter.

4. In a machine of the character set forth, the combination of a reciprocable workholder and means for reciprocating it, a tool-holder supported to be moved toward and away from said work-holder, and means, involving ratchet and pawl mechanism operating automatically to cause said tool-holder to feed the tool therein against the work in said work-holder during the movement of said work-holder in both directions.

5. In a machine of the character set forth, the combination of a reciprocable work-holder and means for reciprocating it, a tool-holder supported to be moved toward and away from said work-holder, and means for feeding said tool-holder toward the work in said work-holder, comprising a ratchet and pawl device, a rotatable member, a reciprocable link connected at one end with said rotatable member eccentric of the axis of the latter and at its opposite end operatively engaging said device to actuate the latter, pinion and rack means operatively connected with said tool-holder and actuated by said pawl and ratchet device, and means for rotating said rotatable member in timed relation to the reciprocations of said work-holder.

6. In a machine of the character set forth, the combination of a reciprocable work-holder and means for reciprocating it, a tool-holder supported to be moved toward and away from said work-holder, and means for feeding said tool-holder toward the work in said work-holder, comprising a rack operatively connected with said tool-holder, a rotatably mounted ratchet, gear means interposed between said ratchet and rack and through the medium of which the movement of the latter is controlled, a pivotably supported pawl for engaging said ratchet to rotate it, a link connected with said pawl for oscillating it, and means for operating said pawl in timed relation to the reciprocations of said work-holder.

7. In a machine of the character set forth, the combination of a reciprocable work-holder and means for reciprocating it, a tool-holder adapted to be moved toward and away from said work-holder, means operating to cause said tool-holder to feed the tool therein against the work in said work-holder, and involving a pawl and ratchet device, and means operating automatically to cause said pawl to shift into a position in which it does not engage said ratchet in its movements for discontinuing the feed, and means operating automatically to effect such shifting of said pawl.

8. In a machine of the character set forth, the combination of a reciprocable work-holder and means for reciprocating it, a tool-holder supported to be moved toward and away from said work-holder, means operating automatically to feed said tool-holder toward the work-holder, and involving pawl and ratchet mechanism, and means controlled by said tool-holder for disengaging the pawl and ratchet of said mechanism for discontinuing the feed of the tool-holder.

9. In a machine of the character set forth, the combination of a reciprocable work-holder and means for reciprocating it, a tool-holder supported to be moved toward and away from said work-holder, means operating automatically to feed said tool-holder toward the work-holder, and including pawl and ratchet mechanism, means controlled by said tool-holder for shifting said pawl out of engagement with said ratchet, and means for holding said pawl out of engagement with said ratchet to discontinue the feed of the tool-holder.

10. In a machine of the character set forth, the combination of a reciprocable work-holder and means for reciprocating it, a tool-holder supported to be moved toward and away from said work-holder, means operating automatically to feed said tool-holder toward the work-holder, and including pawl and ratchet mechanism, means formed with a toggle-portion and controlled by said tool-holder for shifting said pawl out of engagement with said ratchet, and means for holding said pawl out of engagement with said ratchet to discontinue the feed of the tool-holder.

11. In a machine of the character set forth, the combination of a reciprocable work-holder and means for reciprocating it, a tool-holder supported to be moved toward and away from said work-holder, means operating automatically to feed said tool-holder toward the work-holder, and including pawl and ratchet mechanism, a shiftable member provided with a portion adapted when said member is moved in one direction to move said pawl out of engagement with said ratchet, spring means tending to move said shiftable member in said direction, means normally holding said shiftable member in opposition to said spring, in a position in which it does not interfere with the operation of said pawl, means operated by said tool-holder for actuating said third named means to permit said shiftable member to move under the action of said spring, and means for holding said pawl out of engagement with said ratchet to discontinue the feed of the tool-holder, when shifted by said shiftable member out of engagement with said ratchet.

12. In a machine of the character set forth, the combination of a reciprocable work-holder and means for reciprocating it, a tool-holder supported to be moved toward and away from said work-holder, means operating automatically to feed said tool-holder toward the work-holder, and including pawl and ratchet mechanism, a shiftable member provided with a portion adapted when said member is moved in one direction to move said pawl out of engagement with said ratchet, spring means tending to move said shiftable member in said direction, toggle mechanism operatively engaging said shiftable member, releasable means for holding said toggle in opposition to said spring means, in a position wherein said shiftable member does not interfere with the operation of said pawl, means for releasing said toggle to permit said spring means to shift said shiftable member to a position in which said pawl is out of engagement with said ratchet, and means for holding said pawl out of engagement with said ratchet to discontinue the feed of said tool-holder, when said pawl has been actuated by said shiftable member as above stated.

13. In a machine of the character set forth, the combination of a reciprocable work-holder, a tool-holder, and means for reciprocating said work-holder, including a pitman, means for operating said pitman and means connecting said pitman with said workholder, said work-holder and said last-named means being relatively adjustable in a direction lengthwise of the path of reciprocation of said work-holder.

14. In a machine of the character set forth, the combination of a reciprocable work-holder, a tool-holder movable toward and away from said work-holder, and means for reciprocating said work-holder, including a pitman, means for operating said pitman, and means connecting said pitman with said work-holder, said work-holder and said last-named means being relatively adjustable in a direction lengthwise of the path of reciprocation of said work-holder.

15. In a machine of the character set forth, the combination of a reciprocable work-holder, a tool-holder, and means for reciprocating said work-holder including a pitman, means for operating said pitman, said last-named means being adjustable for varying the stroke of said pitman and means connecting said pitman with said work-holder, said work-holder and said last-named means being relatively adjustable in a direction lengthwise of the path of reciprocation of said work-holder.

16. In a machine of the character set forth, the combination of a reciprocable work-holder, a tool-holder movable toward and away from said work-holder and means for reciprocating said work-holder, including a pitman, means for operating said pitman, said last-named means being adjustable for varying the stroke of said pitman, and means connecting said pitman with said work-holder, said work-holder and said last-named means being relatively adjustable in a direction lengthwise of the path of reciprocation of said work-holder.

17. In a machine of the character set forth, the combination of a reciprocable work-holder, a tool-holder movable toward and away from said work-holder, and means for reciprocating said work-holder including a connection with said work-holder, said connection and work-holder being relatively adjustable in a direction lengthwise of the path of reciprocation of said work-holder.

18. In a machine of the character set forth, the combination of a reciprocable work-holder, a tool-holder movable toward and away from said work-holder, means for reciprocating said work-holder including a connection with said work-holder, said connection and work-holder being relatively adjustable in a direction lengthwise of the path of reciprocation of said work-holder, and means operating automatically to feed said tool-holder toward said work-holder.

19. In a machine of the character set forth, the combination of a reciprocable work-holder and means for reciprocating it, a tool-holder supported to be moved toward and away from said work-holder, and means operating automatically to cause said tool-holder to feed the tool therein intermittently against the work in said work-holder during the beginning of its stroke, said first-named-means operating to move the work during the movement of the tool toward the work, at a slower speed than during other portions of its movement.

20. In a machine of the character set forth, the combination of a reciprocable work-holder and means for reciprocating it, constructed and arranged to cause the work-holder to move at a faster rate between the ends of its stroke, than at the ends of its stroke, a tool-holder supported to be moved toward and away from said work-holder, and means operating automatically to cause said tool-holder to feed the tool therein against the work in said work-holder during the movement of said work-holder in both directions at the beginning of each stroke of the latter.

21. In a machine of the character set forth, the combination of a reciprocable work-holder and means for reciprocating it, a tool-holder adapted to be moved toward and away from said work-holder, means operating to cause said tool-holder to feed the tool therein against the work in said work-holder at the beginning of the stroke of the latter and discontinuing the feeding of the tool toward the work, without arresting the movement of said work-holder, whereby the bottom of the groove cut by the machine, is substantially flat.

22. In a machine of the character set forth, the combination of a reciprocable work-holder, a rotatable member having a crank portion, a pitman connected with said crank-portion and with said work-holder and through the medium of which said work-holder is reciprocated and whereby the latter is caused to move at the beginning of its stroke in each direction, at a slower rate of speed than in the middle of its stroke, a tool-holder supported to be moved toward and away from said work-holder, and means operating automatically to cause said tool-holder to feed the tool therein against the work in said work-holder during the movement of said work-holder in both directions at the beginning of each stroke of the latter.

23. In a machine of the character set forth, the combination of a reciprocable work-holder, a tool-holder, and means for reciprocating said work-holder, including a pitman, means for operating said pitman, and a screw connection between said pitman and said workholder constructed and arranged to permit of the relative adjustment of said work-holder and pitman in a direction lengthwise of the path of reciprocation of said work-holder.

24. In a machine of the character set forth, the combination of a reciprocable work-holder, a tool-holder, means for reciprocating said work-holder including a pitman, means for operating said pitman, a screw extending lengthwise of said workholder and rotatable thereon, and a nut engaging the threads of said screw and connected with said pitman, for the purpose set forth.

ALBERT H. SEGLER.